US012663741B2

(12) United States Patent
Yumoto et al.

(10) Patent No.: US 12,663,741 B2
(45) Date of Patent: Jun. 23, 2026

(54) IMAGE FORMING APPARATUS THAT PERFORMS SHADING CORRECTION TO MAINTAIN PRINT POSITION ACCURACY

(71) Applicant: CANON KABUSHIKI KAISHA, Tokyo (JP)

(72) Inventors: Koji Yumoto, Ibaraki (JP); Takashi Yokoya, Saitama (JP); Toshifumi Oikawa, Ibaraki (JP); Yutaka Ando, Ibaraki (JP); Akinobu Nishikata, Chiba (JP); Riki Fukuhara, Chiba (JP); Yuichiro Oda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/416,239

(22) Filed: Jan. 18, 2024

(65) Prior Publication Data

US 2024/0152078 A1 May 9, 2024

Related U.S. Application Data

(63) Continuation of application No. 17/331,821, filed on May 27, 2021, now Pat. No. 11,934,121.

(30) Foreign Application Priority Data

Jun. 5, 2020 (JP) ................................. 2020-098511

(51) Int. Cl.
*G03G 15/20* (2006.01)
*G03G 15/00* (2006.01)
(Continued)

(52) U.S. Cl.
CPC ......... *G03G 15/2039* (2013.01); *G03G 15/22* (2013.01); *G03G 15/6573* (2013.01); (Continued)

(58) Field of Classification Search
CPC .............. G03G 15/2039; G03G 15/22; G03G 15/5062; G03G 15/5016; G03G 15/6573; (Continued)

(56) References Cited

U.S. PATENT DOCUMENTS 7,760,370 B2 7/2010 Oki
8,587,627 B2 11/2013 Takahashi et al.
(Continued)

FOREIGN PATENT DOCUMENTS

CN 102375362 A 3/2012
CN 108628121 A 10/2018
(Continued)

OTHER PUBLICATIONS

Extended European Search Report issued in European Appln. No. 21177035.9, mailed Oct. 8, 2021.
(Continued)

*Primary Examiner* — Stephanie E Bloss
*Assistant Examiner* — Laura Roth
(74) *Attorney, Agent, or Firm* — ROSSI, KIMMS & McDOWELL LLP

(57) ABSTRACT

An image forming apparatus including an image forming unit, a fixing unit, a reading unit, a reference member, and a controller is described. The image forming unit forms an image and a detection image on a sheet. The detection image is used for detecting geometric characteristics of an image to be formed on a sheet by the image forming unit. The fixing unit fixes the image and the detection image formed by the image forming unit on the sheet. The reading unit reads the detection image on the sheet. The controller adjusts geometric characteristics of the image to be formed on a sheet based on a reading result of the detection image by the reading unit, and controls the reading unit to read the
(Continued)

reference member and executes shading correction based on a reading result of the reference member.

19 Claims, 12 Drawing Sheets

(51) Int. Cl.
  *G03G 15/22* (2006.01)
  *H04N 1/00* (2006.01)
(52) U.S. Cl.
  CPC ..... *H04N 1/00037* (2013.01); *H04N 1/00045* (2013.01); *H04N 1/00588* (2013.01); *H04N 1/00801* (2013.01); *H04N 1/00814* (2013.01); *G03G 2215/00042* (2013.01); *G03G 2215/00067* (2013.01)
(58) Field of Classification Search
  CPC .......... G03G 2215/00042; G03G 2215/00067; G03G 2215/00417; G03G 2215/00421; H04N 1/00037; H04N 1/00045; H04N 1/00588; H04N 1/00801; H04N 1/00814
  See application file for complete search history.

(56) References Cited

U.S. PATENT DOCUMENTS

| | | | |
|---|---|---|---|
| 2005/0196183 A1 | 9/2005 | Taguchi et al. | |
| 2005/0237548 A1 | 10/2005 | Suzuki | |
| 2007/0014604 A1* | 1/2007 | Arai .................. | G03G 15/6523 |
| | | | 399/341 |
| 2007/0153077 A1 | 7/2007 | Yamauchi et al. | |
| 2007/0223061 A1 | 9/2007 | Tanaka | |
| 2008/0297857 A1 | 12/2008 | Ishikawa | |
| 2013/0293934 A1 | 11/2013 | Shinto | |
| 2014/0185114 A1 | 7/2014 | Takemura | |
| 2016/0085195 A1* | 3/2016 | Uchida .............. | G03G 15/6517 |
| | | | 399/72 |
| 2017/0038717 A1 | 2/2017 | Oki | |
| 2017/0041510 A1 | 2/2017 | Sakatani | |
| 2017/0104888 A1 | 4/2017 | Nomura | |
| 2018/0052413 A1 | 2/2018 | Toyofuku et al. | |
| 2018/0084145 A1 | 3/2018 | Isokawa et al. | |
| 2018/0220038 A1 | 8/2018 | Sakata | |
| 2018/0275580 A1 | 9/2018 | Watanabe | |
| 2018/0284677 A1 | 10/2018 | Kawatsu | |
| 2019/0079438 A1 | 3/2019 | Iwakoshi et al. | |
| 2019/0171137 A1 | 6/2019 | Kobayashi | |
| 2020/0089151 A1 | 3/2020 | Yoshino | |
| 2020/0112649 A1 | 4/2020 | Xu | |

FOREIGN PATENT DOCUMENTS

| | | | |
|---|---|---|---|
| JP | 2005311644 A | | 11/2005 |
| JP | 2006064895 A | | 3/2006 |
| JP | 2006084796 A | * | 3/2006 |
| JP | 2016148781 A | | 8/2016 |
| JP | 2017030288 A | | 2/2017 |
| JP | 2017147562 A | * | 8/2017 |
| JP | 2017183810 A | | 10/2017 |
| JP | 2018074516 A | | 5/2018 |
| JP | 2018101121 A | | 6/2018 |
| JP | 2018111582 A | | 7/2018 |
| JP | 2019101326 A | | 6/2019 |
| JP | 2020048088 A | * | 3/2020 |
| JP | 2020061623 A | | 4/2020 |

OTHER PUBLICATIONS

Office Action issued in U.S. Appl. No. 17/331,821, mailed on Jan. 23, 2023.
Office Action issued in U.S. Appl. No. 17/331,821, mailed on Jul. 6, 2023.
Notice of Allowance issued in U.S. Appl. No. 17/331,821, mailed on Nov. 3, 2023.

* cited by examiner

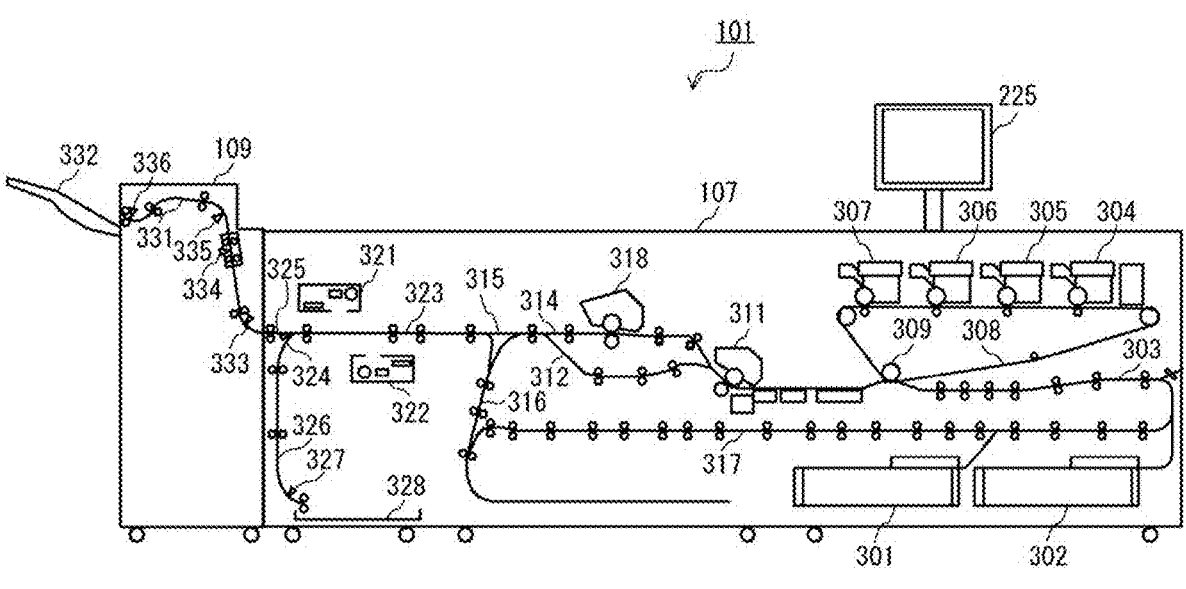
FIG. 3
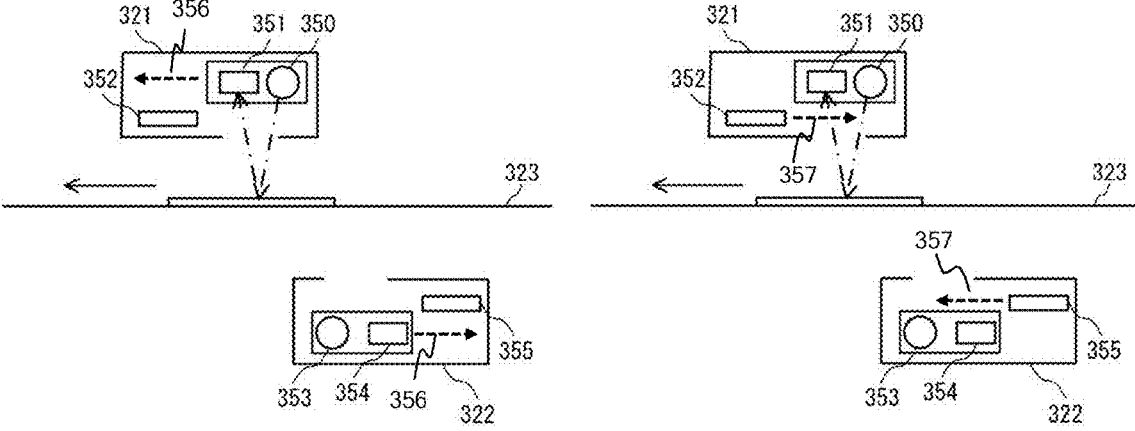
FIG. 4A                    FIG. 4B

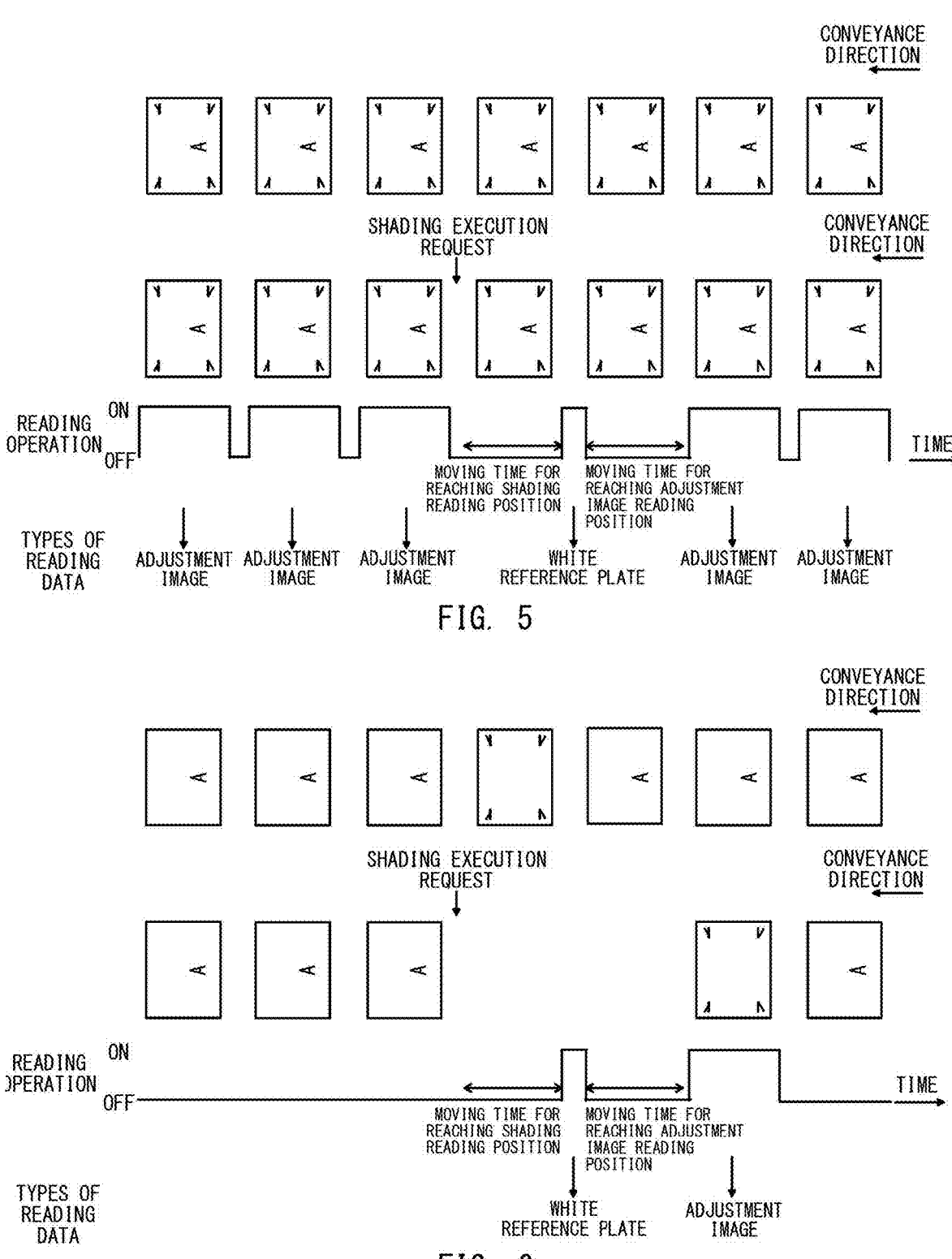

| SHADING CORRECTION VALUE |
|---|
| ⋮ |
| ADJUSTMENT PATCH 1 POSITION [FRONT] X |
| ADJUSTMENT PATCH 1 POSITION [FRONT] Y |
| ADJUSTMENT PATCH 2 POSITION [FRONT] X |
| ADJUSTMENT PATCH 2 POSITION [FRONT] Y |
| ADJUSTMENT PATCH 3 POSITION [FRONT] X |
| ADJUSTMENT PATCH 3 POSITION [FRONT] Y |
| ADJUSTMENT PATCH 4 POSITION [FRONT] X |
| ADJUSTMENT PATCH 4 POSITION [FRONT] Y |
| ⋮ |
| ADJUSTMENT CHART INSERT INTERVAL |
| TIP POSITION CORRECTION VALUE |
| LEFT END POSITION CORRECTION VALUE |
| MAIN SCANNING DIRECTION MAGNIFICATION |
| SUB-SCANNING DIRECTION MAGNIFICATION |
| SKEW POSITION CORRECTION VALUE |
| ⋮ |

FIG. 7

IMAGE FORMING APPARATUS THAT PERFORMS SHADING CORRECTION TO MAINTAIN PRINT POSITION ACCURACY

BACKGROUND OF THE INVENTION

Field of the Invention

The present invention relates to an image forming apparatus, such as a printer, a copying machine, a facsimile, and a multifunction apparatus.

Description of the Related Art

As to printed matters printed by a commercial printing machine, it is desirable to stabilize printing position accuracy for both a back surface and front surface. U.S. Pat. No. 7,760,370 B2 discloses an image forming apparatus which stabilizes the printing position accuracy. In the image forming apparatus, in order to stabilize the print position accuracy, an adjustment image, which serves as a mark of a print position (a position at which an image is formed) is printed on a sheet to create the adjustment chart. The adjustment image on the adjustment chart is read by an image reading sensor provided in a sheet conveyance path. The image forming apparatus adjusts a print position by feeding back a reading result of the adjustment image to an image forming condition.

The image reading sensor is calibrated in order to maintain detection accuracy. The calibration of the image reading sensor is called "shading correction". The shading correction is periodically executed when continuously forming images on a plurality of sheets, for example. Japanese Patent Application Laid-open No. 2018-111582 discloses a technique for performing the shading correction of a plurality of image reading sensors. Without the shading correction, the detection accuracy cannot be maintained, thus print position accuracy cannot be stabilized with high accuracy.

SUMMARY OF THE INVENTION

An image forming apparatus according to the present disclosure includes: an image forming unit configured to form an image and a detection image on a sheet, wherein the detection image is used for detecting a geometric characteristics of an image to be formed on a sheet by the image forming unit; a fixing unit configured to fix the image and the detection image formed by the image forming unit on the sheet; a reading unit configured to read the detection image on the sheet which passes a reading area downstream of the fixing unit in a conveyance direction along which the sheet is conveyed; a reference member; and a controller configured to: control the image forming unit to form the image and the detection image on a same sheet; control the reading unit to read the detection image; adjust geometric characteristics of an image to be formed on a sheet based on a reading result of the detection image by the reading unit; and control the reading unit to read the reference member to execute shading correction based on a reading result thereof, wherein, in a case where the shading correction is executed while a plurality of sheets on which the image and the detection image are formed are passing the reading area, the controller is configured to, without reading the detection image on the sheet passing through the reading area by the reading unit, control the reading unit to read the reference member while continuing passing of the plurality of sheets through the reading area.

Further features of the present invention will become apparent from the following description of exemplary embodiments (with reference to the attached drawings).

BRIEF DESCRIPTION OF THE DRAWINGS

FIG. 3 is a configuration diagram of an image forming apparatus.

FIGS. 4A and 4B are explanatory diagrams of a CIS.

FIG. 5 is a schematic diagram illustrating a sheet conveyed in a real time adjustment mode.

FIG. 6 is a schematic diagram illustrating a sheet conveyed in an interruption adjustment mode.

FIG. 7 is an explanatory diagram of information to be stored in a memory.

DESCRIPTION OF THE EMBODIMENTS

At least one embodiment of the present disclosure is described below in detail with reference to the drawings.

First Embodiment

<Image Processing System>

Figure 1:
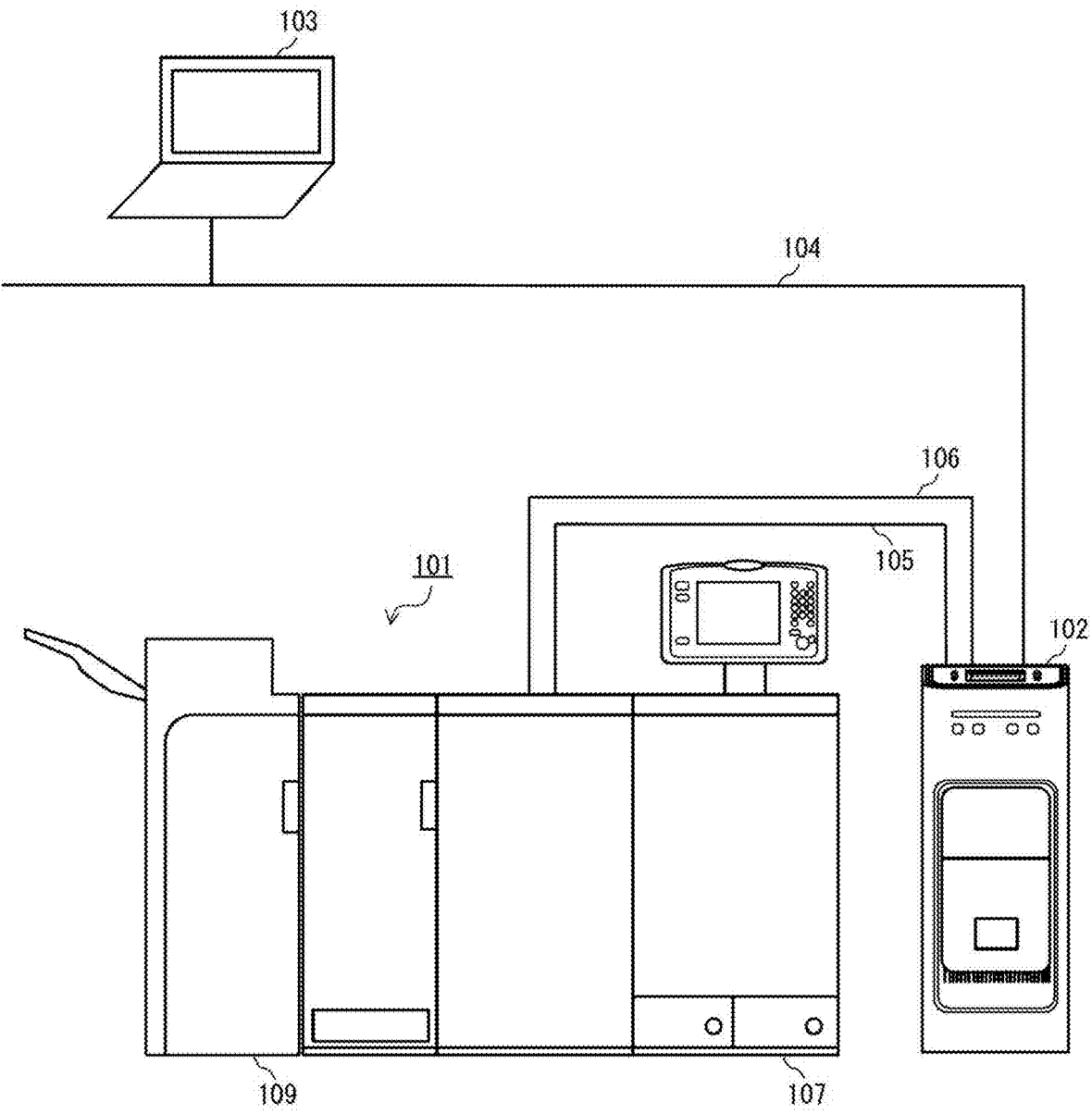
FIG. 1 is a configuration diagram of an image processing system.

FIG. 1 is a configuration diagram of an image processing system including an image forming apparatus of the present embodiment. The image processing system is equipped with an image forming apparatus 101 and an external controller 102. The image forming apparatus 101 is a multifunction apparatus, a multi-function peripheral (MFP) or the like, for example. The external controller 102 is an image processing controller, a digital front end (DFE), a print server or the like, for example.

The image forming apparatus 101 and the external controller 102 are communicably connected via an internal LAN (Local Area Network) 105 and a video cable 106. The external controller 102 is connected to a client PC (Personal Computer) 103 via an external LAN 104. The external controller 102 obtains a print instruction (print job) from the client PC 103.

A printer driver, having a function of converting image data into a print description language which can be processed by the external controller 102, is installed in the client PC 103. A user can issue an instruction for printing by various applications via the printer driver. The printer driver transmits the image data to the external controller 102 based on a print job from the user. The external controller 102 receives a print job including the image data from the client PC 103. The external controller 102 performs data analysis and rasterization processing on the received print instruction and instructs the image forming apparatus 101 to perform printing (image forming) of an image based on the image data.

The image forming apparatus 101 is configured by connecting a plurality of devices, each having different functions, including a printing apparatus 107. Further, the image forming apparatus 101 can perform complicated printing processing such as bookbinding. The image forming apparatus 101 of the present embodiment includes a printing apparatus 107 and a finisher 109. The printing apparatus 107 uses a developing agent (for example, toner) to form an image on the sheet fed from a sheet feeding unit provided in a lower part of a main body. The printing apparatus 107 forms a yellow (Y), magenta (M), cyan (C), and black (K) image. On the sheet, a full-color image in which images of each color are superimposed is formed. The sheet on which the image is formed is conveyed from the printing apparatus 107 to the finisher 109. The finisher 109 loads the sheet on which the image is formed.

In the configuration of the image processing system of the present embodiment, the external controller 102 is connected to the image forming apparatus 101, however, the external controller 102 may be omitted. The image forming apparatus 101 may be configured to directly obtain the print job including the image data from the client PC 103 via the external LAN 104. In this case, data analysis processing and rasterization processing, which are performed by the external controller 102, are performed by the image forming apparatus 101. This means that the image forming apparatus 101 and the external controller 102 may be integrally configured.

<System Configuration>

Figure 2:
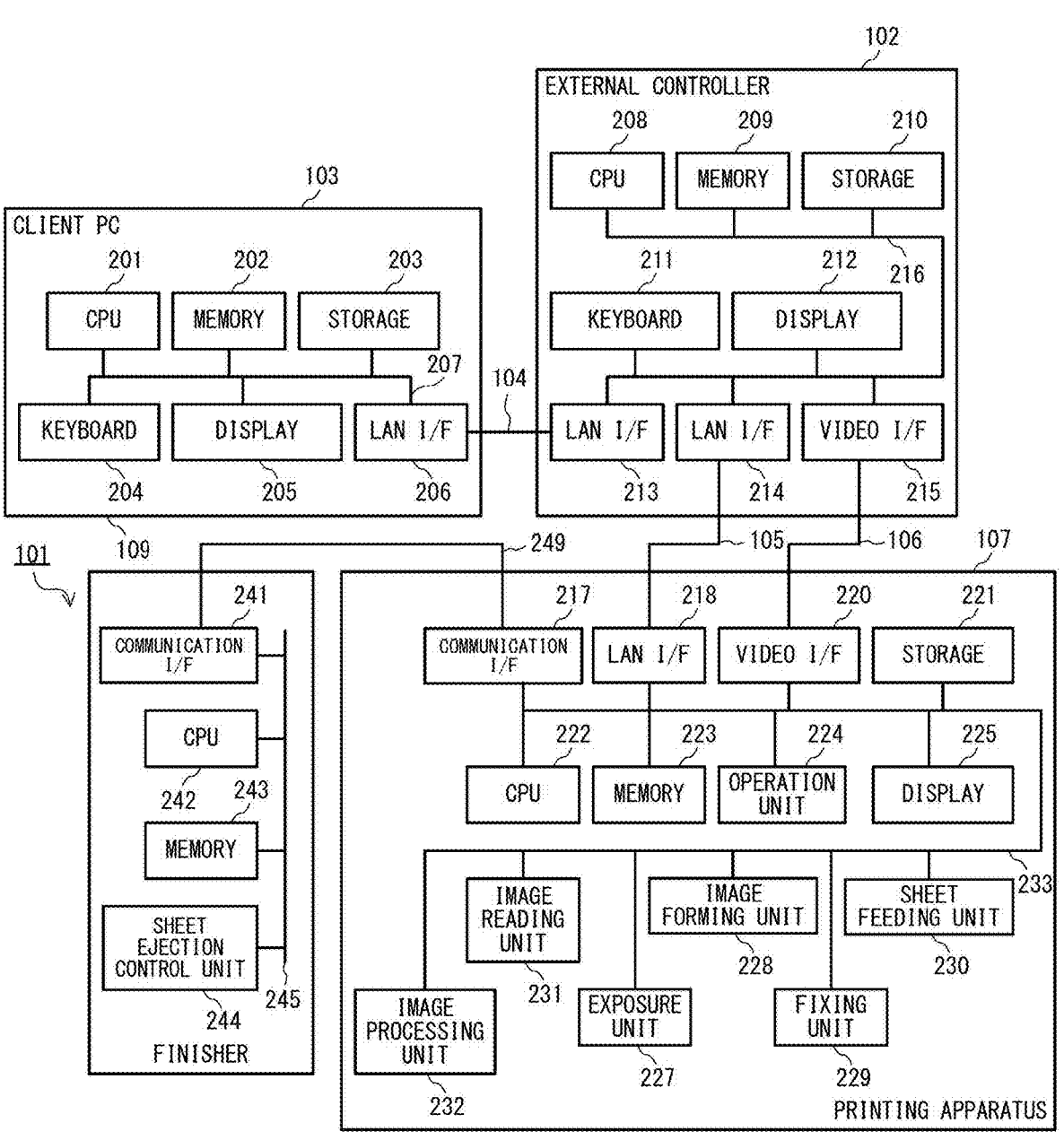
FIG. 2 is a configuration diagram of a system.

FIG. 2 is a system configuration diagram for controlling an operation of the image processing system. Here, the controller, which is for controlling the operation of each of the image forming apparatus 101, the external controller 102, and the client PC 103, will be described.

Printing Apparatus

In order to communicate with other devices, the printing apparatus 107 includes a communication interface (I/F) 217, a LAN OF 218, and a video OF 220. In order to control an operation of the printing apparatus 107, the printing apparatus 107 includes a CPU (Central Processing Unit) 222, a memory 223, a storage 221, an image reading unit 231, and an image processing unit 232. The printing apparatus 107 includes, for forming an image, an exposure unit 227, an image forming unit 228, a fixing unit 229, and a sheet feeding unit 230. The printing apparatus 107 includes an operation unit 224 and a display 225, each for a user interface. These components are communicably connected to each other via the system bus 233.

The communication OF 217 is connected to the finisher 109 via a communication cable 249 to control communication with the finisher 109. When the printing apparatus 107 cooperates with the finisher 109, information and data are transmitted and received via the communication OF 217. The LAN OF 218 is connected to the external controller 102 via the internal LAN 105 to control communication with the external controller 102. The printing apparatus 107 receives a print setting and the image data from the external controller 102 via the LAN OF 218. The video OF 220 is connected to the external controller 102 via the video cable 106 to control communication with the external controller 102. The printing apparatus 107 receives the image data which represents an image to be formed from the external controller 102 via the video OF 220.

The CPU 222 comprehensively controls image processing and printing by executing a computer program stored in the storage 221. The memory 223 provides a work area for the CPU 222 to execute various processes. When performing an image forming process, the CPU 222 controls the exposure unit 227, the image forming unit 228, the fixing unit 229, and the sheet feeding unit 230.

The exposure unit 227 includes a photoconductor, a charging wire to charge the photoconductor, and a light source to expose the photoconductor which is charged by the charging wire to form an electrostatic latent image on the photoconductor. The photoconductor is, for example, a photosensitive belt having a photosensitive layer formed on a surface of a belt-shaped elastic member, or a photosensitive drum having a photosensitive layer formed on a surface of a cylinder. Further, a charging roller may be used instead of the charging wire. The exposure unit 227 charges, with the charging wire, a surface of the photoconductor to a uniform negative potential. The exposure unit 227 outputs laser light from the light source based on the image data. The laser light scans the uniformly charged surface of the photoconductor. Thus, on the photoconductor, a potential at a position at which the laser beam is irradiated varies to form an electrostatic latent on the surface. Four photoconductors are provided corresponding to the four colors of yellow (Y), magenta (M), cyan (C), and black (K). Electrostatic latent images corresponding to images of different colors are formed on the four photoconductors.

The image forming unit 228 transfers the toner image formed on the photoconductor on the sheet. The image forming unit 228 includes a developer, a transfer unit, a toner replenishment unit, and the like. The developer forms the toner image by adhering negatively charged toner, provided from the developing cylinder, to the electrostatic latent image formed on the surface of the photoconductor. Corresponding to the four colors of yellow (Y), magenta (M), cyan (C), and black (K), four developers are provided. The developer visualizes the electrostatic latent image on the photoconductor with the toner of the corresponding color.

An intermediate transfer belt, provided in the transfer unit, transfers the toner image from the photoconductor on the intermediate transfer belt. At a position opposing to the photoconductor, with the intermediate transfer belt in between, a primary transfer roller is provided. By applying a positive potential to the primary transfer roller, from each of the four photoconductors, the toner image is superimposed and transferred on the intermediate transfer belt. As a result, a full-color toner image is formed on the intermediate transfer belt. The toner image formed on the intermediate transfer belt is transferred to the sheet by a secondary transfer roller described later. By applying a positive potential to the secondary transfer roller, the full-color toner image is transferred from the intermediate transfer belt to the sheet.

The fixing unit 229 fixes the transferred toner image on the sheet. The fixing unit 229 includes a heater and a roller pair. The fixing unit 229 heats and pressurizes the toner image on the sheet, by the heater and the roller pair, to melt and fix the same on the sheet. Thereby the image is formed on the sheet. To control feeding operations of the sheet, the sheet feeding unit 230 is provided with rollers, such as a feeding roller, and various sensors in its feeding path.

The image reading unit 231 reads the image formed on the conveyed sheet based on an instruction from the CPU 222.

When adjusting image forming conditions, for example, the CPU 222 reads, by the image reading unit 231, an adjustment image of the image forming condition formed on the sheet. The operation unit 224 is an input device which receives input of various settings and operation instructions from the user. The operation unit 224 may be an input key of any type or a touch panel. The display 225 is an output device which displays setting information of the image forming apparatus 101 and a processing status (Status information) of the print job and the like.

Finisher

A finisher 109 executes a stapling process to a printed material output, for example, from the printing apparatus 107. The finisher 109 includes a communication OF 241, a CPU 242, a memory 243, and a sheet ejection control unit 244. These components are communicably connected to each other via the system bus 245. The communication OF 241 is connected to the printing apparatus 107 via a communication cable 249 and controls communication with the printing apparatus 107. When the finisher 109 and the printing apparatus 107 operate in cooperation with each other, information and data are transmitted and received via the communication OF 241. The CPU 242 executes a control program stored in the memory 243 and performs various controls necessary for sheet ejection. The memory 243 stores the control program. The memory 243 also provides a work area for the CPU 242 to execute various processes. The sheet ejection control unit 244 discharges the conveyed sheets to a stack tray 332 based on an instruction from the CPU 242.

External Controller

The external controller 102 includes a LAN OF 213, a LAN OF 214, and a video OF 215 in order to communicate with other devices. The external controller 102 includes a CPU 208, a memory 209, and a storage 210 to control the operation of the external controller 102. The external controller 102 includes a keyboard 211 and a display 212, as user interfaces. These components are communicably connected to each other via the system bus 216.

The LAN OF 213 is connected to the client PC 103 via the external LAN 104 and controls communication with the client PC 103. The external controller 102 obtains the print job from the client PC 103 via LAN OF 213. The LAN OF 214 is connected to the printing apparatus 107 via the internal LAN 105 and controls communication with the printing apparatus 107. The external controller 102 transmits print data or the image data to the printing apparatus 107 via the LAN OF 214. The video OF 215 is connected to the printing apparatus 107 via the video cable 106 to control communication with the printing apparatus 107. The external controller 102 transmits the image data to the printing apparatus 107 via the video OF 215.

By executing the computer program stored in the storage 210, the CPU 208 comprehensively performs processing such as receiving the image data obtained from the client PC 103, RIP processing, and transmission of the image data to the image forming apparatus 101. The memory 209 provides a work area for the CPU 208 to execute various processes. The keyboard 211 is an input device which receives input of various settings and operation instructions from the user. The display 212 is an output device which displays information of an execution application of the external controller 102, as a still image or a moving image.

Client PC

The client PC 103 includes a CPU 201, a memory 202, a storage 203, a keyboard 204, a display 205, and a LAN I/F

206. These components are communicably connected to each other via the system bus 207.

By executing the computer program stored in the storage 203, the CPU 201 controls an operation of the client PC 103. In the present embodiment, the CPU 201 generates the image data and transmits the print job. The memory 202 provides a work area for the CPU 201 to executes various processes. The keyboard 204 and the display 205 are user interfaces. The keyboard 204 is an input device which receives instructions from the user. The display 205 is an output device which displays information, such as an execution application of the client PC 103, as a still image or a moving image. The LAN OF 206 is connected to the external controller 102 via the external LAN 104 to control communication with the external controller 102. The client PC 103 transmits the print job to the external controller 102 by the LAN OF 206.

The external controller 102 and the image forming apparatus 101 are connected by the internal LAN 105 and the video cable 106. However, other configurations may be used as long as data necessary for printing can be transmitted and received, for example, these devices may be connected only via video cables. Each of the memory 202, the memory 209, the memory 223, and the memory 243 may be a storage device for holding data or programs, respectively. As to these memories, a volatile RAM (Random Access Memory), a non-volatile ROM (Read Only Memory), a storage device, a USB (Universal Serial Bus) memory, and the like may be used.

<Configuration of Image Forming Apparatus>

FIG. 3 is a configuration diagram of the image forming apparatus 101. A display 225 is provided on the upper part of the printing apparatus 107. The display 225 displays information for the printing status and settings of the image forming apparatus 101. The sheet on which the image is formed by the printing apparatus 107 is conveyed to the finisher 109 provided in the subsequent stage.

The printing apparatus 107 includes, as the sheet feeding unit 230, a plurality of sheet feeding decks 301, 302, and a conveyance path 303. Different types of sheets can be accommodated in each of the sheet feeding decks 301 and 302. As to the sheets accommodated in each of the sheet feeding decks 301 and 302, the topmost sheet is separated and fed to the conveyance path 303. The printing apparatus 107 includes, as the exposure unit 227, the image forming units 304, 305, 306, and 307 for forming an image. The printing apparatus 107 forms a color image. Therefore, the image forming unit 304 forms a black (K) image (the toner image). The image forming unit 305 forms an image of cyan (C) (the toner image). The image forming unit 306 forms a magenta (M) image (the toner image). The image forming unit 307 forms a yellow (Y) image (the toner image).

The printing apparatus 107 includes, as the image forming unit 228, a secondary transfer roller 309 and an intermediate transfer belt 308 on which the toner image is transferred from each of the image forming units 304, 305, 306, and 307. The intermediate transfer belt 308 rotates clockwise in FIG. 3, and the image is transferred on the intermediate transfer belt 308 by the image forming unit 307, the image forming unit 306, the image forming unit 305, and the image forming unit 304 in this order. As a result, a full-color toner image is formed on the intermediate transfer belt 308. The intermediate transfer belt 308 rotates to convey the toner image to the secondary transfer roller 309. The sheet is conveyed toward the secondary transfer roller 309 in synchronization with the timing when the toner image is conveyed to the secondary transfer roller 309. The secondary transfer roller 309 transfers the toner image on the intermediate transfer belt 308 on the conveyed sheet.

The printing apparatus 107 includes, as the fixing unit 229, a first fixing device 311 and a second fixing device 318. The first fixing device 311 and the second fixing device 318 have the same configuration and fix the toner image on the sheet. For this purpose, each of the first fixing device 311 and the second fixing device 318 has a pressure roller and a heat roller. The sheet is heated and pressurized by passing between the pressure roller and the heat roller, thereby the toner image is melted and crimped. The sheet, after processed by the second fixing device 318, is conveyed to the conveyance path 314. The second fixing device 318 is arranged downstream of the first fixing device 311 in a sheet conveyance direction. The second fixing device 318 is used for adding gloss to the image on the sheet which is fixed by the first fixing device 311 and for improving a fixing characteristic. Therefore, the second fixing device 318 may be omitted depending on the type of the sheet and/or content of the image forming process. A conveyance path 312 is provided in order to convey the sheet fixed by the first fixing device 311 without passing through the second fixing device 318.

A conveyance path 315 and a reverse path 316 are arranged on the downstream side of a point where the conveyance path 314 and the conveyance path 312 are merged. When double-sided printing is instructed, the sheet is conveyed to the reverse path 316. The sheet conveyed to the reverse path 316, after its conveyance direction is reversed in the reverse path 316, is conveyed to the double-sided conveyance path 317. After passing the reverse path 316 and the double-sided conveyance path 317, a surface of the sheet on which the image is formed (first surface) is reversed. The sheet is conveyed to the conveyance path 303 via the double-sided conveyance path 317, and an image is formed on the second surface, which is a surface opposite to the first surface, by the secondary transfer roller 309 and the fixing unit 229.

In a case of single-sided printing, or in a case where images have been formed on both sides in the double-sided printing, the sheet is conveyed to the conveyance path 315. A conveyance path 323 is arranged on the downstream side of the conveyance path 315 in the sheet conveyance direction.

CISs (Contact Image Sensor) 321 and 322, as the image reading unit 231, are arranged on the conveyance path 323 so as to face each other with the conveyance path 323 in between. FIGS. 4A and 4B are explanatory diagrams of the CIS 321 and 322. The CIS 321 is an optical sensor which reads an image of an upper surface (Step Second surface) of the sheet which has been double-side printed and conveyed along the conveyance path 323. The CIS 322 is an optical sensor which reads an image of a lower surface (first surface) of the sheet which has been double-side printed and conveyed along the conveyance path 323.

The CIS 321 includes an LED (Light Emitting Diode) 350 as a light source, a reading sensor 351 as a light receiving unit, and a white reference plate 352. The LED 350 irradiates the upper surface of the sheet with light at the timing when the sheet conveyed along the conveyance path 323 reaches a reading position (reading area). The reading sensor 351 includes a line sensor in which a plurality of light receiving elements (photoelectric conversion elements) in a direction orthogonal to the sheet conveying direction. Therefore, the direction orthogonal to the sheet conveying direction is a main scanning direction of the CIS 321. The reading sensor 351 receives the light reflected by the sheet. The plurality of light receiving elements of the reading sensor 351 output the output values (electric signals) based on the intensity of the received reflected light. The output values (electric signals) output from the plurality of light receiving elements are transmitted to the CPU 222. In this way, the image formed on the sheet is read.

The white reference plate 352 is a calibration member (reference member) which is used when executing shading correction of CIS 321. As to the white reference plate 352, a portion to which colorimetric analysis is performed has a predetermined density (color). When executing the shading correction, the LED 350 and the reading sensor 351 move to a position where the reading of the white reference plate 352 can be performed (see directional arrows 356 shown in FIG. 4A). Alternatively, at the time of executing the shading correction, the white reference plate 352 is moved to a reading position of the LED 350 and the reading sensor 351 (see directional arrows 357 shown in FIG. 4B). The shading correction of the CIS 321 is executed based on a reading result of the white reference plate 352. Therefore, the CIS 321 cannot read the image formed on the sheet at the time of shading correction.

The CIS 322, like the CIS 321, includes an LED 353, a reading sensor 354, and a white reference plate 355. The CIS 322 operates, in the same manner as the CIS 321, to read an image formed on a lower surface of a sheet at a timing when the sheet conveyed along the conveyance path 323 reaches a reading position. The image reading unit 231 may be realized by a CCD sensor or a CMOS sensor as well as by the CIS 321 and the CIS 322.

In the printing apparatus 107 of the present embodiment, the adjustment image (the detection image) for adjusting the image forming condition can be formed on both sides of the sheet. Hereinafter, the sheet on which the adjustment image is formed is referred to as "adjustment chart". The printing apparatus 107 prints the adjustment image on the sheet to generate the adjustment chart and reads the adjustment image by the CIS 321 and the CIS 322. The read image of the adjustment chart by the CIS 321 and the CIS 322 is stored in the memory 223. The CPU 222 refers to the memory 223 to analyze the read image which is read by the CIS 321 and the CIS 322, and feeds the result of the analysis back to the image forming conditions to adjust the image forming conditions.

For example, when a temperature in the printing apparatus 107 rises, geometric characteristics of the image formed on the sheet change as compared to that formed on the sheet when the temperature in the printing apparatus 107 is relatively low. Here, the geometric characteristics of the image are a degree of squareness, and a print position of the image with respect to the sheet, etc., for example. The printing apparatus 107 generates the adjustment chart and detects the geometric characteristics based on the reading result of the CIS 321 and the CIS 322. The CPU 222 performs an affine transformation on the image data so that the above described detected geometric characteristics become ideal geometric characteristics. The printing apparatus 107 can control the geometric characteristics of the image formed on the sheet by forming the image on the sheet based on the image data converted by the CPU 222. As a result, the printing apparatus 107 can suppress fluctuations in the geometric characteristics of the image due to fluctuation in the temperature in the image forming apparatus 101.

The adjustment image (the detection image) formed in the adjustment chart may be an image for detecting geometric characteristics. However, the adjustment image may be an image for detecting image density or an image for detecting color misregistration. When the adjustment image for detecting the image density is formed, the CPU 222 generates the image forming condition for suppressing the fluctuation of the image density based on the reading result of the CIS 321 (or the CIS 322). The image density of the printing apparatus 107 is adjusted to be an ideal image density by controlling, by the CPU 222, the intensity of the light source of the exposure unit 227 based on the image forming condition. Alternatively, the CPU 222 generates a one-dimensional tone correction table for suppressing fluctuations in the image density based on the reading result of the CIS 321 (or the CIS 322). The CPU 222 converts the image data based on the tone correction table. The printing apparatus 107 forms an image on the sheet based on the image data converted by the CPU 222 so that the image density of the printing apparatus 107 is adjusted to an ideal image density.

Further, in a case where the adjustment image for detecting the color misregistration is formed, the CPU 222 detects the color misregistration based on the reading result of the CIS 321 (or the CIS 322). The CPU 222 corrects the color misregistration by controlling the position of the image formed on the photoconductor by the exposure unit 227 based on the detected color misregistration.

A format of the adjustment image may be any one of the formats in which it is printed as the adjustment chart on a sheet different from a sheet on which a user image is formed, or a format in which the adjustment chart is printed on the same sheet on which the user image is formed. When it is printed as the adjustment chart, the CPU 222 generates, based on the received image data, every time the number of prints reaches a predetermined number N, the image data in which the adjustment chart is inserted between the user image of Nth page and the user image of (N+1)th page. When the adjustment image is formed on the same sheet as the user image, it is preferable to form the adjustment image in an area of the sheet to be cut. This is because the adjustment image is cut to be removed from the printed matter. Here, the user image is an image included in the image data transferred from the client PC 103.

The image forming apparatus 101 of the present embodiment is controlled based on a real time adjustment mode and an interruption adjustment mode. The real time adjustment mode is a mode in which the adjustment image is printed on the same sheet as the user image, and the interruption adjustment mode is a mode in which the adjustment chart is printed for each predetermined number of sheets. Hereinafter, a description is made for a case where the image forming apparatus 101 of the present embodiment forms the adjustment image for detecting the geometric characteristics. The user can set whether or not to correct the geometric characteristics by using the operation unit 224 of the printing apparatus 107. Further, when executing the correction of the geometric characteristics, the user selects the adjustment mode from the real time adjustment mode and the interruption adjustment mode. A configuration for selecting the adjustment mode is not limited to the configuration using the operation unit 224. For example, the selection of the adjustment mode may be performed in a configuration in which the user selects the adjustment mode using the client PC 103.

In the real time adjustment mode of the present embodiment, the adjustment image is printed for every page. FIG. 5 is a schematic diagram illustrating a sheet conveyed in the real time adjustment mode and illustrates a state in which the adjustment image is printed every page in the real time adjustment mode. The CIS 321 and the CIS 322 are provided in the conveyance path, and the sheets, each of which the adjustment image is printed, pass through the conveyance path 323 from the leftmost sheet to the rightmost sheet in sequence. As shown in FIG. 5, the adjustment image has v-shaped marks formed at the four corners of the sheet. A user image is also formed on the sheet on which the adjustment image is printed. The sheet on which both the adjustment image and the user image are formed is discharged to the stack tray 332.

In the interruption adjustment mode of the present embodiment, the adjustment chart is inserted every time a predetermined number of user images are formed. For example, the adjustment chart is inserted between the sheet on which the user image of the Nth page is formed and the sheet on which the user image of the (N+1)th page is formed. FIG. 6 is a schematic diagram illustrating a sheet conveyed in an interruption adjustment mode. In the interruption adjustment mode, the adjustment chart is printed every predetermined number of sheets. Similar to the schematic diagram of FIG. 5, in the schematic diagram of FIG. 6, the CIS 321 and the CIS 322 are provided in the conveyance path, and the sheets pass through the conveyance path 323 from the leftmost sheet to the rightmost sheet in sequence. As illustrated in FIG. 6, the adjustment chart has v-shaped marks formed on the four corners of the sheet. Here, the user image is not formed in the adjustment chart. In the interruption adjustment mode, the adjustment chart is discharged to a tray other than a tray to which the sheet on which the user image is formed is discharged. In the present embodiment, the sheet on which the user image is formed is discharged to the stack tray 332, and the adjustment chart is discharged to a discharge tray 328.

As described above, the adjustment chart is separated so as not to be mixed with the printed matter corresponding to the print job. Therefore, the printing apparatus 107 includes a flapper 324, a discharge path 326, a convenience sensor 327, and the discharge tray 328. The adjustment chart whose image (the adjustment image) has been read by the CIS 321 and the CIS 322 is conveyed to the discharge path 326 by the flapper 324. The sheet conveyed to the discharge path 326 is discharged to the discharge tray 328.

In a case where the sheet is not the adjustment chart, the sheet is conveyed from the conveyance path 323 to the downstream conveyance path 325 by the flapper 324. The sheet conveyed to the downstream conveyance path 325 is delivered to the finisher 109. In a case where the printing apparatus 107 receives a notification of an occurrence of a conveyance jam from the finisher 109, the printing apparatus 107 switches the flapper 324 to the discharge path 326 side, regardless of whether the sheet is the adjustment chart or not. Thus, all the sheets in the printing apparatus (residual sheet) are discharged to the discharge tray 328. By discharging the residual sheet to the discharge tray 328, the load of jam processing for the user is reduced.

On the finisher 109, the sheet delivered from the printing apparatus 107 can be stacked. The finisher 109 includes a conveyance path 331 and a stack tray 332 for stacking sheets. The conveyance sensors 333, 334, 335, and 336 are provided in the conveyance path 331. The sheet conveyed from the printing apparatus 107 is stacked on the stack tray 332 via the conveyance path 331. The conveyance sensors 333, 334, 335, and 336 detect whether the sheet has passed through the conveyance path 331. In a case where the leading edge or the trailing edge of the sheet in the conveying direction is not detected by the conveyance sensors 333, 334, 335, and 336 even after a lapse of a predetermined time from the start of conveying the sheet, the CPU 242 determines that a conveyance jam (conveyance failure) has occurred in the finisher 109. In this case, the CPU 242 notifies the printing apparatus 107 that the conveyance jam has occurred.

FIG. 7 is an explanatory diagram of information stored in the memory 223 of the printing apparatus 107. The information used for shading correction and correction of the geometric characteristics is stored in a memory 223. The information used for the shading correction is a correction coefficient (the shading correction value) obtained from the reading result of the white reference plate 352, 355. The information used for adjusting the image position is an adjustment patch position (front) for the front surface and the adjustment patch position (back) for the back surface, which are obtained from the reading result of the adjustment chart. In addition to this, the memory 223 stores a correction value for adjusting the geometric characteristics. The correction values for adjusting the geometric characteristics include tip position correction, left end position correction, a main scanning direction magnification, and the like. The correction value for adjusting the geometric characteristics is used when forming the image by the printing apparatus 107.

In addition, the memory 223 stores an interval at which the adjustment chart is generated in the interruption adjustment mode (the adjustment chart insertion interval). The adjustment chart is generated every time the number of printed sheets reaches a predetermined number. That is, the correction value for adjusting the geometric characteristics in the interruption adjustment mode is updated every time a predetermined number of sheets are printed. The predetermined number of sheets can be changed based on an instruction information of the number of sheets from the user. The instruction information of the number of sheets is, for example, an integer larger than 0. A print position adjustment interval is set based on the instruction information of the number of sheets.

FIG. 8A to FIG. 8D are explanatory diagrams of setting screens for setting an interval for generating the adjustment chart in the interruption adjustment mode. The setting screen is displayed on the display 225 by the CPU 222. The adjustment chart is generated in the adjustment mode. The adjustment mode is set by the user using the operation unit 224.

Figure 8A:
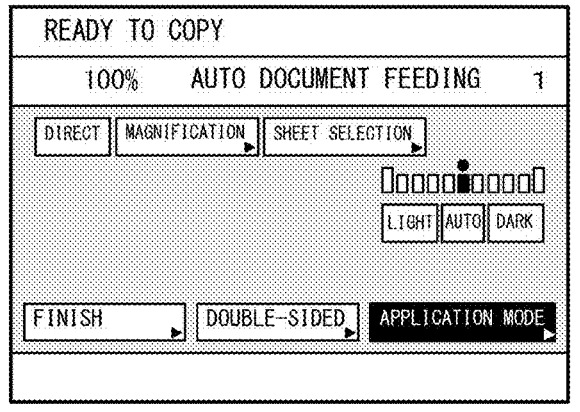
FIG. 8A to FIG. 8D are explanatory diagrams of setting screens.
Figure 8B:
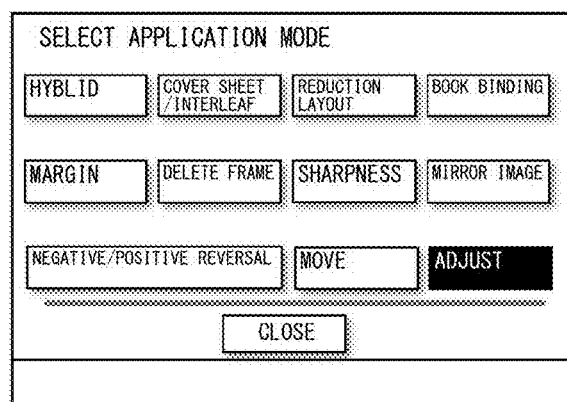
Figure 8C:
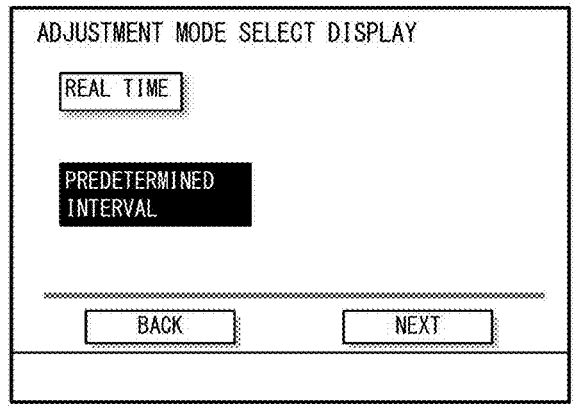

FIG. 8A represents an initial screen. When the user selects a soft key "APPLICATION MODE" in the initial screen, the CPU 222 displays an application mode selection screen, shown in FIG. 8B, on the display 225. When the user selects a soft key "ADJUST" in the application mode selection screen, the CPU 222 displays the adjustment mode selection screen, shown in FIG. 8C, on the display 225. The printing apparatus 107 will operate in the adjustment mode by selecting the soft key "ADJUST". When the user selects a soft key "CLOSE" in the application mode selection screen, the CPU 222 displays the initial screen on the display 225.

When the user selects a softkey "REAL TIME" in the selection screen, the real time adjustment mode is selected. The CPU 222 notifies the external controller 102 of a content of the setting. When instructing the printing apparatus 107 to form an image according to the print job, the external controller 102 notifies that the adjustment image is to be printed in the margin area.

Figure 8D:
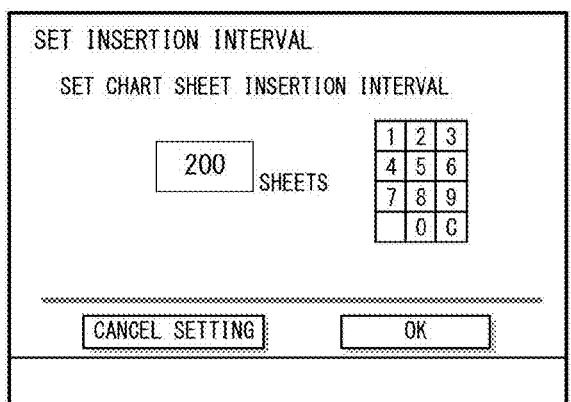

When the user selects the soft key "PREDETERMINED INTERVAL" from the adjustment mode selection screen, the CPU 222 displays the insertion interval setting screen of FIG. 8D on the display 225. When the user selects a soft key "BACK" in the application mode selection screen, the CPU 222 displays the adjustment mode selection screen on the display 225.

When the user inputs the number of insertion interval sheets using a numeric keypad on the insertion interval setting screen and selects a soft key "OK", the CPU 222 sets the number of insertion interval sheets in the adjustment chart. CPU 222 stores the number of insertion interval sheets input by the insertion interval setting screen in the memory 223 when the soft key "OK" is chosen. When the user selects the soft key "RETURN" from the insertion interval setting screen, the CPU 222 displays the adjustment mode selection screen on the display 225.

The CPU 222 notifies the external controller 102 of the number of insertion interval sheets stored in the memory 223. The external controller 102 stores the notified number of insertion interval sheets in the memory 209. When the number of insertion interval sheets has been printed, the external controller 102 instructs the printing apparatus 107 to generate the adjustment chart. For example, in a case where "200" sheets are input and "OK" is selected in the insertion interval setting screen, an instruction to print the adjustment chart is input, every time 200 sheets are printed, to the printing apparatus 107 from the external controller 102. When the print job instructs to print 1000 sheets, the printing apparatus 107 generates the adjustment chart between pages 200 and 201, between pages 400 and 401, between pages 600 and 601, and between pages 800 and 801.

As described above, a predetermined number (the number of insertion interval sheets), which corresponds to a timing at which the adjustment chart is generated, is set. An example in which the number of insertion interval sheets is set by the printing apparatus 107 has been described above. However, the number of insertion interval sheets may be set by the external controller 102 or the client PC 103. When the external controller 102 is used, each screen, shown in FIG. 8A to FIG. 8D, is displayed on the display 212. When the client PC 103 is used, each screen of FIG. 8A to FIG. 8D is displayed on the display 205. The number of insertion interval sheets is notified from the client PC 103 to the external controller 102.

<Shading Correction>

As to the CIS 321 and the CIS 322, initial adjustment, including the shading correction, is executed. Here, the initial adjustment of the CIS 321 will be described, however, the initial adjustment of the CIS 322 is also performed in the same manner.

When the CPU 222 starts the initial adjustment, the LED 350 and the reading sensor 351 are moved directly above the white reference plate 352 by a CIS drive motor (not shown). Hereinafter, a position directly above the white reference plate 352 is referred to as a shading reading position. When moving of the LED 350 and the reading sensor 351 is completed, the CPU 222 turns on the LED 350, reads the image of the white reference plate 352, and calculates a gain adjustment value of the CIS 321 according to its reading result. After reading the white reference plate 352 at the shading reading position, the CPU 222 moves the LED 350 and the reading sensor 351 to a chart reading position shown in FIG. 4A by a CIS drive motor (not shown).

Figure 9:
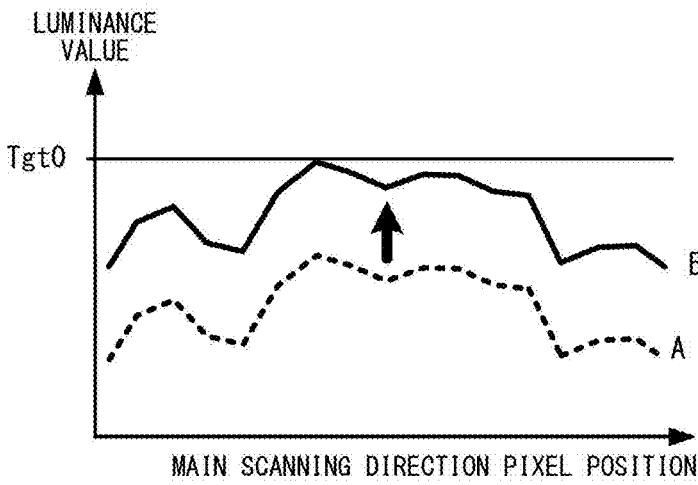
FIG. 9 is an explanatory diagram of gain adjustment.

FIG. 9 is an explanatory diagram of gain adjustment. The horizontal axis indicates the position of each pixel when the image of the white reference plate 352 is read by the main scanning direction for one line. The vertical axis indicates a reading result (luminance value) at each pixel position. The characteristic of the luminance value when the white reference plate 352 is read with an initial setting at the time of startup is shown by the dotted line A. The maximum value of the brightness value of "white" is indicated by "Tgt0".

The maximum value of the reading result (luminance value) of the white reference plate 352 in the initial setting does not match the expected "white" brightness value Tgt0, due to the light distribution characteristics of the LED 350 and the reading sensor 351. The reading result is uniformly amplified by an amplifier circuit in the image processing unit 232 so that the maximum value of the brightness value of the reading result matches Tgt0. This amplification factor is the gain adjustment value. The characteristic of the luminance value for one line after adjusted by the gain adjustment value is shown by the solid line B. The CPU 222 calculates the gain adjustment value, sets the calculated gain adjustment value in the image processing unit 232, and reflects the same in the subsequent reading processing.

As shown in FIG. 9, even if the white reference plate 352 has a uniform color on the entire surface, the read characteristics of the luminance value as the reading result thereof vary depending on the pixel position of the main scanning direction. To correct the variation, the shading correction is executed. After setting the gain adjustment value in the image processing unit 232, the CPU 222 again reads the image of the white reference plate 352 by the CIS 321 to generate the shading correction value based on the reading result.

Figure 10A:
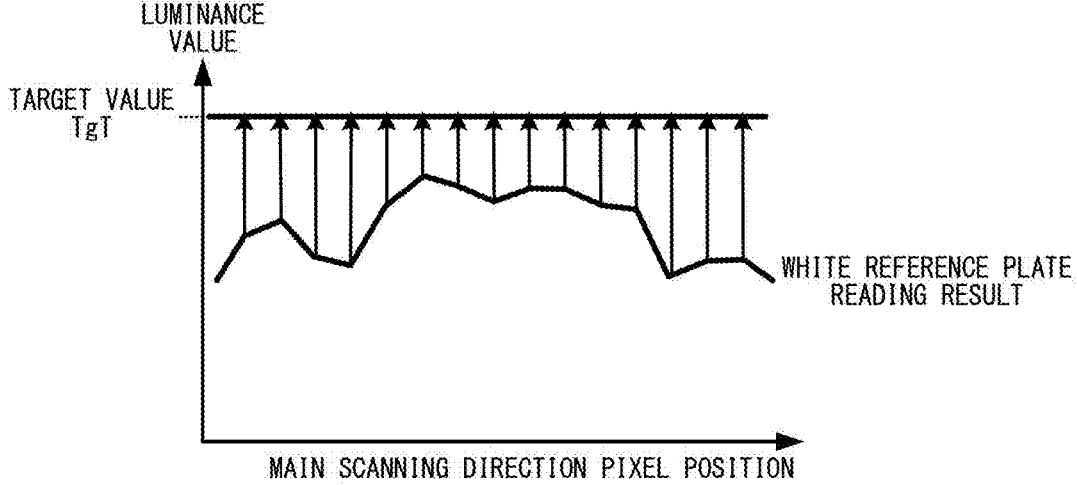
FIG. 10A and FIG. 10B are explanatory diagrams of a shading correction value.
Figure 10B:
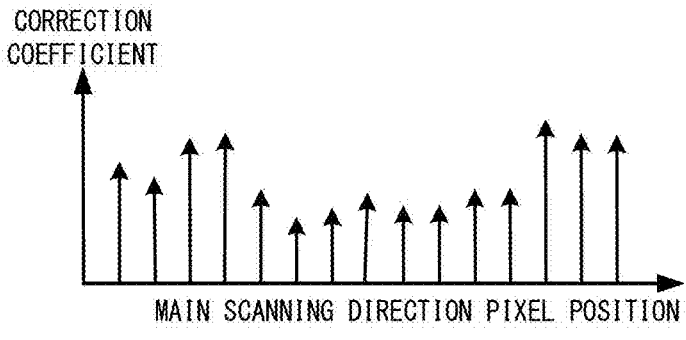

FIG. 10A and FIG. 10B are explanatory diagrams of the shading correction value. The solid line in FIG. 10A shows characteristics of a luminance value for one line after the gain adjustment. The horizontal axis indicates a pixel position of the main scanning direction. The vertical axis indicates a brightness value of each pixel position. Preferably, the reading result (luminance value) of the white reference plate 352 having a uniform density has a uniform "white" luminance value. The brightness indicating "white" is a target value Tgt. The value of the target value Tgt is larger than the maximum value Tgt0 of the brightness value and is previously determined according to the content of the job to be executed.

As shown by arrows in FIG. 10A, the CPU 222 calculates the shading correction value for each pixel in the main scanning direction so that the brightness value of one line becomes the target value Tgt at each pixel position. The length of the arrow at each pixel position corresponds to the shading correction value. The calculated shading correction value is stored in the memory 223 for each pixel position of the main scanning direction through the image processing unit 232. FIG. 10B shows the shading correction value for each pixel of the main scanning direction. When the image is read by the CIS 321, the shading correction value of the corresponding pixel position is reflected (i.e., the shading correction is executed) in the reading result of each pixel. Therefore, the CPU 222 is allowed to suppress variations between the pixels (light receiving elements) of the LED 350 and the reading sensor 351, thus the uniform reading result is obtained. After the shading correction, the CPU 222 can store the reading result of the image after the shading correction in the memory 223.

It is necessary to execute the shading correction every time the number of sheets passing through the reading positions of CIS 321 and CIS 322 reaches a predetermined number. In this embodiment, the shading correction is executed every 100 sheets, however, the predetermined number of sheets may be set arbitrarily. The predetermined number is the number of sheets which pass through the reading positions of the CIS 321 and the CIS 322, regardless of whether or not the CIS 321 and the CIS 322 read the image of the sheet. When one hundred (100) sheets have been conveyed, the CPU 222 executes shading correction of the CIS 321 and the CIS 322. As shown in FIG. 11C, the shading correction may be executed every time the cumulative lighting time of the LED 350 reaches a predetermined time. In step S4001, the cumulative lighting time of the led 350 is read. In step S4002, it is determined whether the cumulative lighting time of the led 350 reaches the predetermined time. In step S4003, shading correction is performed if the cumulative lighting time of the led 350 reaches the predetermined time (Y to step S4002). Alternatively, the CIS 321 may be provided with a temperature sensor to execute the shading correction when the change in the detected temperature of the temperature sensor is equal to or more than a predetermined temperature, as shown in FIG. 11D. In step S5001, the change in temperature is read. In step S5002, it is determined whether the change in the detected temperature of the temperature sensor is equal to or more than the predetermined temperature. In step S5003, shading correction is performed if the change in the detected temperature of the temperature sensor is equal to or more than the predetermined temperature (Y to step S5002). The shading correction of the CIS 321 can be executed even during the sheet is conveyed since the LED 350 and the reading sensor 351 move directly above the white reference plate 352. Similarly, the shading correction of the CIS 322 can also be executed during the sheet is conveyed.

<Adjustment of the Image Forming Condition at the Time of Shading Correction>

Figure 11A:
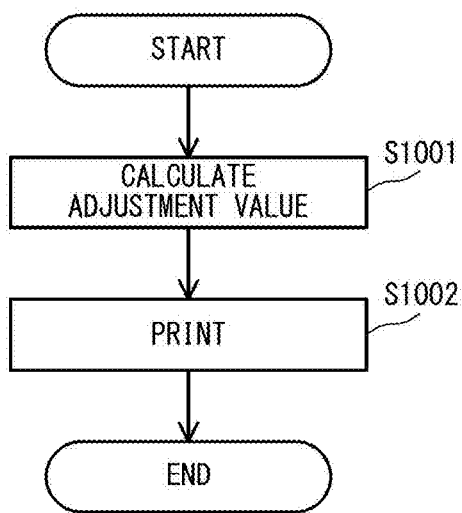
FIGS. 11A-11D are flowcharts representing adjustment processes of the image forming condition.
Figure 11B:
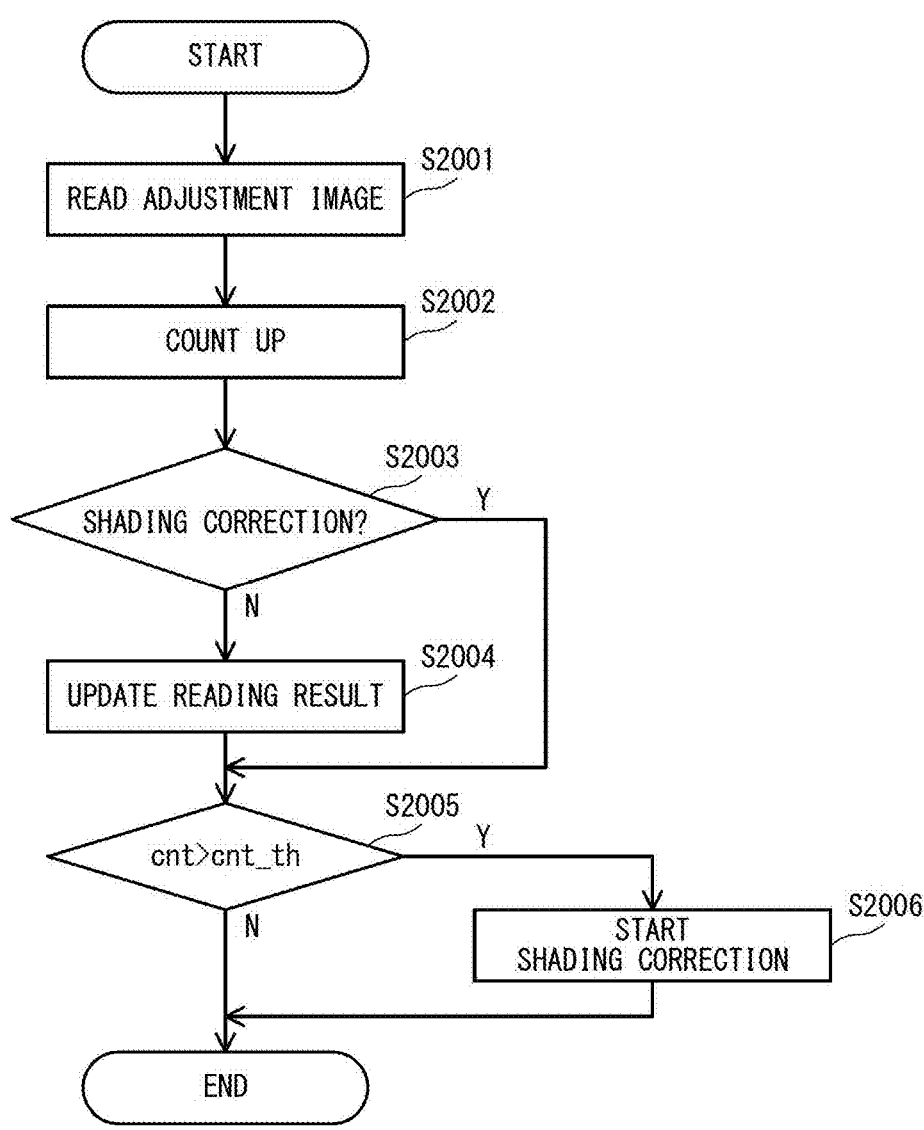
Figures 11C, 11D:
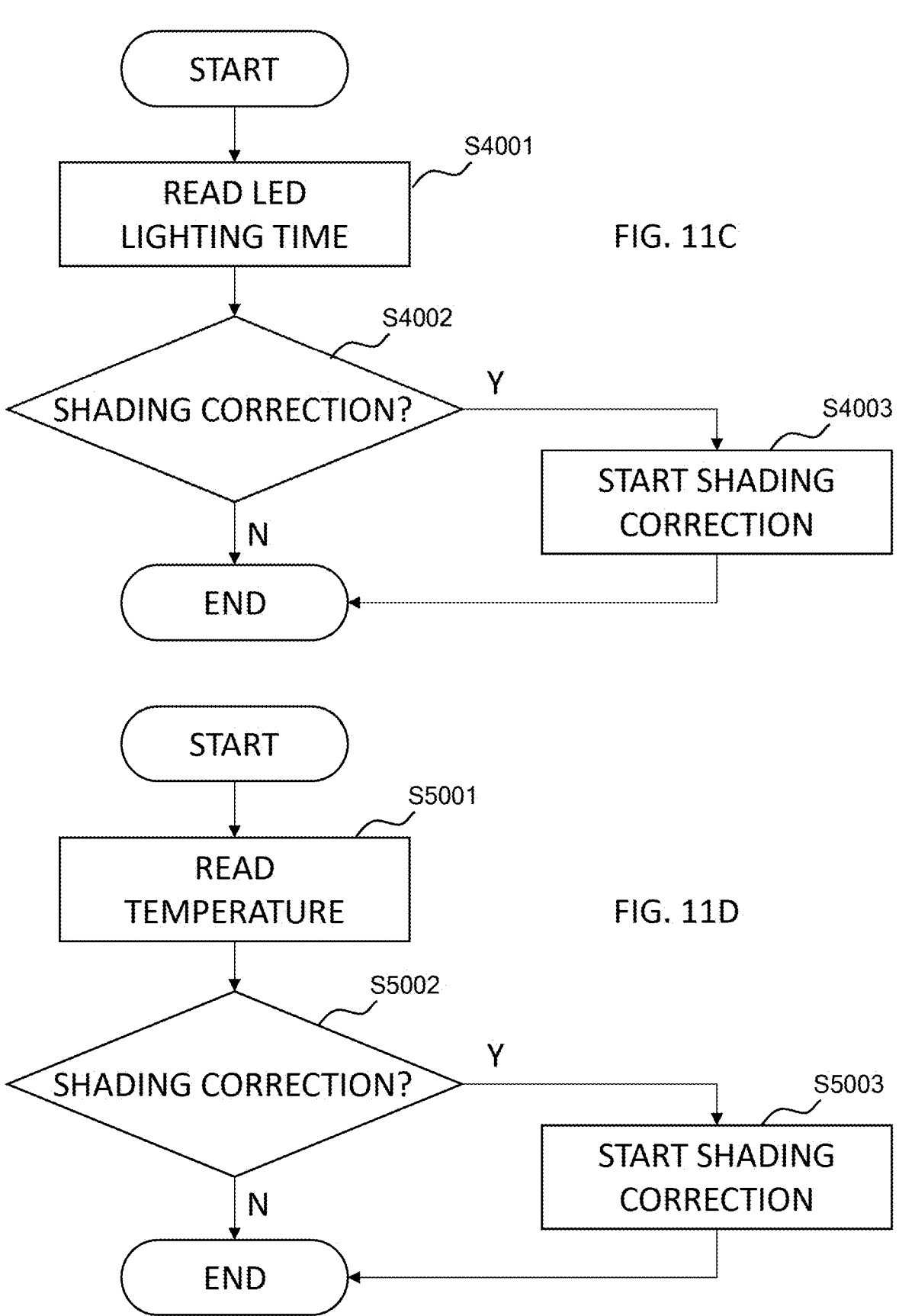

FIG. 11A and FIG. 11B are flowcharts representing the image by the adjustment chart at the time of shading correction.

FIG. 11A is a flowchart of the image forming process for one page. The CPU 222 calculates an adjustment value of the image forming condition from the reading result of the adjustment chart stored in the memory 223. Then, the CPU 222 stores the adjustment value in the memory 223. The adjustment value of the image forming condition is, for example, a difference between the detected geometric characteristics and the ideal geometric characteristics. The CPU 222 calculates the adjustment value based on the reading result of the adjustment chart to store the same in the memory 223 (Step S1001). The CPU 222 performs affine transformation to the image data based on the adjustment value stored in the memory 223, and prints the image on a sheet based on the transformed image data (Step S1002). In the real time adjustment mode, the CPU 222 forms the user image and the adjustment image on each page. In the interruption adjustment mode, the CPU 222 prints the user image corresponding to the print job on the sheet. After printing the user image on a predetermined number of sheets, which corresponds to the adjustment chart insertion interval, the CPU 222 prints the adjustment image on the sheet. By printing the adjustment image on the sheet, the adjustment chart is generated.

FIG. 11B is a flowchart representing the reading process of the adjustment chart. The shading correction of this embodiment is executed every time 100 pages of images are printed. The CPU 222 reads the adjustment image by the image reading unit 231 (CISs 321, 322) (Step S2001). The CPU 222 counts up a correction counter cnt, which represents the number of sheets having passed the reading positions of the CIS 321 and the CIS 322, by one (Step S2002).

The CPU 222 determines whether or not the shading correction has been executed while reading the adjustment image (Step S2003). When the shading correction has not been executed (Step S2003: N), the CPU 222 updates the reading result of the adjustment image stored in the memory 223 with the reading result obtained by performing S2001 (Step S2004). The reading result of the adjustment image stored in the memory 223 is used in calculating the adjustment value. When shading correction has been executed (Step S2003: Y), the CPU 222 does not update the reading result of the adjustment image stored in the memory 223. Since the adjustment image cannot be read while the shading correction is executed, the CPU 222 cannot update the reading result.

Then, the CPU 222 determines whether or not to execute shading correction based on the correction counter cnt. The CPU 222 determines whether or not to execute the shading correction depending on whether or not the correction counter cnt is larger than a predetermined threshold value cnt_th (Step S2005). As described above, the shading correction is executed every time the number of sheets passing through the reading positions of the CIS 321 and the CIS 322 reaches a predetermined number. This predetermined number is the threshold value cnt_th and is "100" in this embodiment.

When the correction counter cnt is equal to or less than the threshold value cnt_th, i.e., 100 sheets or less (Step S2005: N), the CPU 222 ends the process without executing shading correction. When the correction counter cnt is larger than the threshold value cnt_th, i.e., more than 100 sheets (Step S2005: Y), the CPU 222 starts the shading correction (Step S2006). After the shading correction, the CPU 222 ends the process.

As described above, in the present embodiment, the periodic execution of the shading correction of the CIS 321 and the CIS 322 and the reading process of the adjustment image are performed in parallel. Therefore, it is possible to suppress a decrease in productivity caused by the shading correction. In this case, the adjustment image at the time of shading correction is not applied to the adjustment value at the time of printing, since the adjustment image is not read.

Second Embodiment

The image forming apparatus 101 of the first embodiment gives priority, regardless of the adjustment mode, to the reading operation of the white reference plate 352 when a shading correction execution timing arrives even in a case where the adjustment image passes the reading position. Therefore, even though the interruption adjustment chart is printed in the interruption adjustment mode, the shading correction is prioritized, thus reading of the adjustment chart may be skipped. When the reading of the adjustment chart is skipped (i.e., the reading is not performed), the deviation of the geometric characteristics of the image cannot be corrected with high accuracy until the next adjustment value is updated.

Therefore, the image forming apparatus 101 of the second embodiment controls, in the interruption adjustment mode, a timing at which the adjustment chart passes the reading position to prevent skipping of the reading of the adjustment chart caused by executing the shading correction. For example, the CPU 222 determines whether or not the reading of the adjustment chart is skipped. In a case where the reading of the adjustment chart is skipped, the CPU delays the formation of the accommodation chart and the conveyance of the sheet on which the adjustment chart is printed.

In FIG. 5, which is a schematic diagram illustrating a sheet conveyed in the real time adjustment mode, ON or OFF of the reading operation of the CIS 321 and the type of the reading data obtained in the reading operation are shown. In FIG. 5, even after an execution timing (execution request) of the shading correction has arrived, a formation timing of the adjustment image and the user image are not delayed. As shown in FIG. 5, the reading data of the adjustment image is obtained from the leftmost page to the third page, and, while the sheets of the fourth page and the fifth page pass through the reading position, the reading data of the adjustment image is not obtained. While the sheets of the fourth and the fifth pages pass through the reading position, the reading data of the white reference plate 352 is obtained. Then, from a timing at which the sheet of the sixth page passes the reading position, obtaining of the reading data of the adjustment image is resumed.

FIG. 6, which is a schematic diagram illustrating a sheet conveyed in the interruption adjustment mode, shows ON or OFF of the reading operation of the CIS 321 and the type of the reading data obtained in the reading operation. In FIG. 6, after the execution timing (execution request) of the shading correction has arrived, the adjustment chart does not reach the reading position. This is because the formation timing of the adjustment image is delayed. At this time, the formation of the adjustment patch on the photoconductor has not started. After that, the CPU 222 controls the formation timing of the adjustment patch on the photoconductor so that the adjustment chart reaches the reading position after completing the reading of the white reference plate 352. As shown in FIG. 6, the reading data of the white reference plate 352 is obtained in a period from the time when the third page from the leftmost page passes through the reading position until the adjustment chart passes through the reading position, and, after the CIS 321 has transitioned to a state in which it can read the chart, the adjustment chart passes the reading position. Since the reading of the white reference plate 352 and the reading of the adjustment chart are executed in sequence, the reading of the adjustment chart is not skipped.

According to the image forming apparatus 101 of the second embodiment, the decrease in productivity also can be suppressed by executing the shading correction in the real time adjustment mode. In the interruption adjustment mode, it is possible to prevent skipping of the detection of the geometric characteristics. In the real time adjustment mode, the time from the completion of reading the white reference plate 352 to the next reading of the adjustment image is short. Therefore, even if the update of the adjustment value is delayed by reading the white reference plate 352, the influence of the delay on the deviation of the geometric characteristics is small. By prioritizing the reading of the white reference plate 352 in the interruption adjustment mode, the period until the next reading of the adjustment image is increased. In a case where the adjustment value is not updated due to the reading of the white reference plate 352, the deviation of the geometric characteristics is not suppressed. Therefore, the image forming apparatus 101 of the second embodiment delays the formation of the adjustment chart in the interruption adjustment mode to suppress the decrease in the image quality caused by skipping the reading of the adjustment chart.

Third Embodiment

The shading correction described in the first embodiment is executed every time the predetermined number of sheets pass the reading position of the CIS 321 and the CIS 322, or every time the cumulative lighting time of the LED 350 reaches a predetermined time. Therefore, in the interruption adjustment mode, the shading correction may be executed a plurality of times during a period in which the adjustment chart does not pass through the reading position. As described above, when the reading of the adjustment chart is skipped, the deviation of the geometric characteristics of the image cannot be corrected with high accuracy until the next adjustment value is updated. Further, in the interruption adjustment mode, the productivity of the image forming apparatus 101 is decreased.

Therefore, the image forming apparatus 101 of the third embodiment controls, in the interruption adjustment mode, the timing at which the adjustment chart passes the reading position so that the reading of the adjustment chart is not skipped at the time of shading correction. Further, the image forming apparatus 101 of the third embodiment determines the execution timing of the shading correction in the interruption adjustment mode. The image forming apparatus 100 executes shading correction immediately before the adjustment chart passes the reading position so that this execution timing and the timing at which the adjustment chart passes the reading position do not match.

Figure 15:
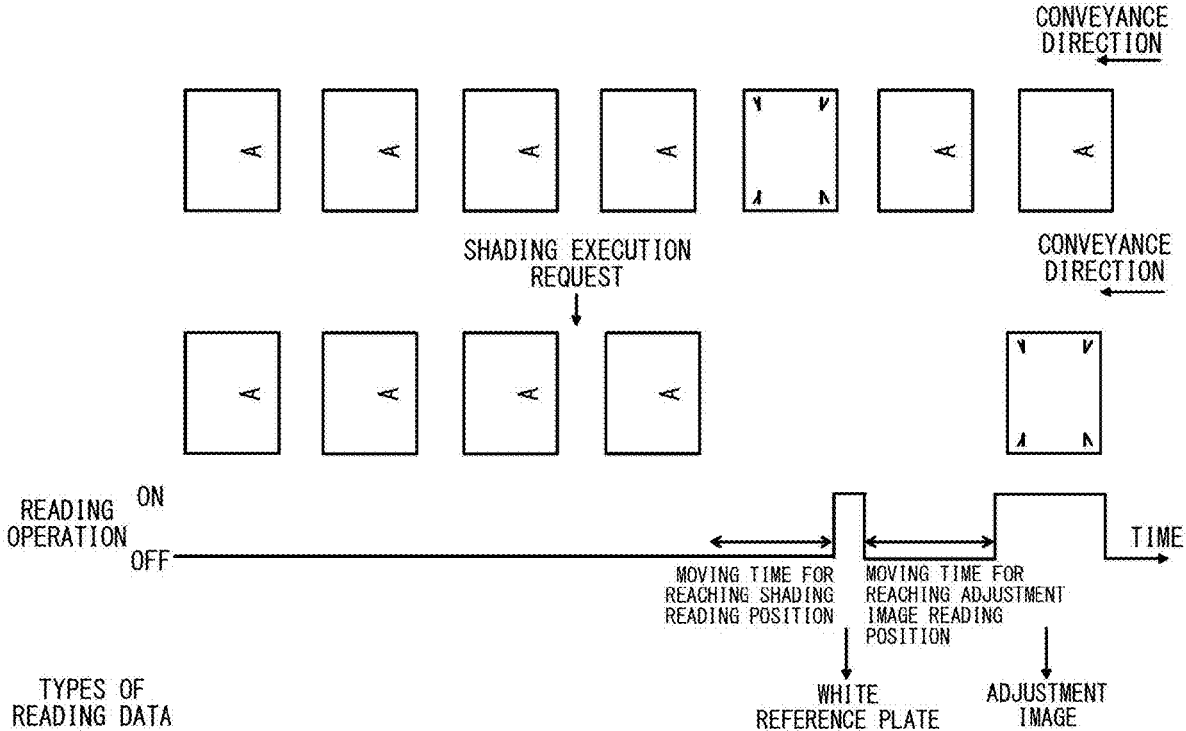
FIG. 15 is a schematic diagram illustrating a sheet conveyed in an interruption adjustment mode of another embodiment.

Here, in the real time adjustment mode, the sheet is conveyed as in the sheet conveyed in the image forming apparatus 101 of the second embodiment. Therefore, the description of the sheet conveyed in the real time adjustment mode of the third embodiment is omitted. On the other hand, FIG. 15 is a schematic diagram illustrating the sheet conveyed in the interruption adjustment mode. When the cumulative lighting time of the LED 350 reaches a predetermined time (for example, 2 minutes) in the interruption adjustment mode, the CPU 222 determines that the shading correction needs to be executed, and outputs a shading execution request. However, the image forming apparatus 101 of the third embodiment does not immediately execute the shading correction even if the cumulative lighting time reaches a predetermined time. After the shading execution request is output, the CPU 222 determines whether or not the sheet conveyed to the reading position is the adjustment chart. Even if the shading execution request is output, the CPU 222 does not execute the shading correction in a case where the sheet conveyed to the reading position is a sheet other than the adjustment chart (a sheet on which the user image is formed).

When it is determined, with the shading execution request has been output, that the sheet conveyed to the reading position is the adjustment chart, the CPU 222 delays the formation timing of the adjustment image to widen a sheet-to-sheet interval between a sheet immediately before the adjustment chart and the adjustment chart. At this time, the formation of the adjustment patch on the photoconductor has not started. Then, the CPU 222 controls the formation timing of the adjustment patch on the photoconductor such that the adjustment chart reaches the reading position after the reading of the white reference plate 352 is completed. As illustrated in FIG. 15, the reading data of the white reference plate 352 is obtained in a period from the time when the fourth page from the left end passes through the reading position until the adjustment chart passes through the reading position. After the CIS 321 has transitioned to a state in which it can read the adjustment chart, the adjustment chart passes through the reading position. Since the reading of the white reference plate 352 and the reading of the adjustment chart are sequentially executed, the reading of the adjustment chart is not skipped. Further, the shading correction is executed immediately before the timing when the adjustment chart passes the reading position in a state where the shading correction execution request has been output. Therefore, it is possible to suppress the decrease in the productivity of the image forming apparatus 101 due to excessively executing the shading correction.

According to the image forming apparatus 101 of the third embodiment, in the real time adjustment mode, the decrease in productivity can also be suppressed by executing shading correction, and, in the interruption adjustment mode, skipping detection of the geometric characteristics of the image can be suppressed. Further, in the interruption adjustment mode, it is possible to suppress the excessive execution of the shading correction. In the real time adjustment mode, the period after completing the reading of the white reference plate 352 the time until the next reading of the adjustment image is short. Therefore, even if the update of the adjustment value is delayed by reading the white reference plate 352, the influence of the delay on the deviation of the geometric characteristics is small. By prioritizing the reading of the white reference plate 352 in the interruption adjustment mode, the time until the next reading of the adjustment image is increased. In a case where the adjustment value is not updated due to the reading of the white reference plate 352, the deviation of the geometric characteristics is not suppressed. Therefore, the image forming apparatus 101 of the third embodiment delays the formation of the adjustment chart in the interruption adjustment mode to suppress the decrease in the image quality caused by skipping the reading of the adjustment chart.

The image forming apparatus of the third embodiment has a configuration, in a case where the shading correction is executed, in which the distance between the last sheet of a predetermined number of sheets on which the user image is formed and the adjustment chart is increased. However, the present disclosure is not limited to a configuration which controls the distance between the adjustment chart and the sheet immediately before the same. For example, the present disclosure includes a configuration in which the distance between the adjustment chart and a sheet which is two sheets before the adjustment chart is increased. The number of sheets is not limited to two sheets, i.e., the number may be appropriately determined. Regardless of the number of sheets, what is needed is a configuration in which adjustment chart is read by the CIS 321 and the CIS 322 when the adjustment chart passes through the reading position.

Modification Example

Hereinafter, a description is made for a process of suppressing decrease in productivity while maintaining the accuracy of the image position to be above a certain level based on the reading result of the adjustment chart by the CIS 321 and the CIS 322. In this embodiment, the image forming apparatus 101 operates in two operation modes, i.e., an image quality priority mode in which the image quality is preferentially maintained, and a productivity priority mode in which productivity is prioritized. In the image quality priority mode, the reading of the adjustment chart by the CIS 321 and the CIS 322 is prioritized, and the generation and the reading of the adjustment chart wait until the shading correction is completed. In the productivity priority mode, as shown in FIG. 11B, the shading correction is executed during the reading of the adjustment chart. The image quality priority mode and the productivity priority mode are switched according to the generating and reading frequency of the adjustment chart. Since the productivity priority mode is shown in FIG. 11B, the description thereof will be omitted.

<Switching of Operation Mode>

When the number of insertion interval sheets of the adjustment chart is larger than a predetermined threshold value (for example, 50 sheets), the frequency of reading the adjustment chart becomes low. In this case, the operation mode is set to the image quality priority mode in which the reading of the adjustment chart is delayed until the shading correction is completed to reliably read the adjustment chart.

When the insertion interval of the adjustment chart is shorter than the threshold value, the reading frequency of the adjustment chart becomes high. Thereby, the fluctuation of the printing position of the image formed by the printing apparatus 107 can be further suppressed. In this case, the operation mode is set to the productivity priority mode in which the shading correction and the reading of the adjustment chart are executed in parallel.

<Shading Correction and Reading Timing of the Adjustment Image>

Figures 12A, 12B:
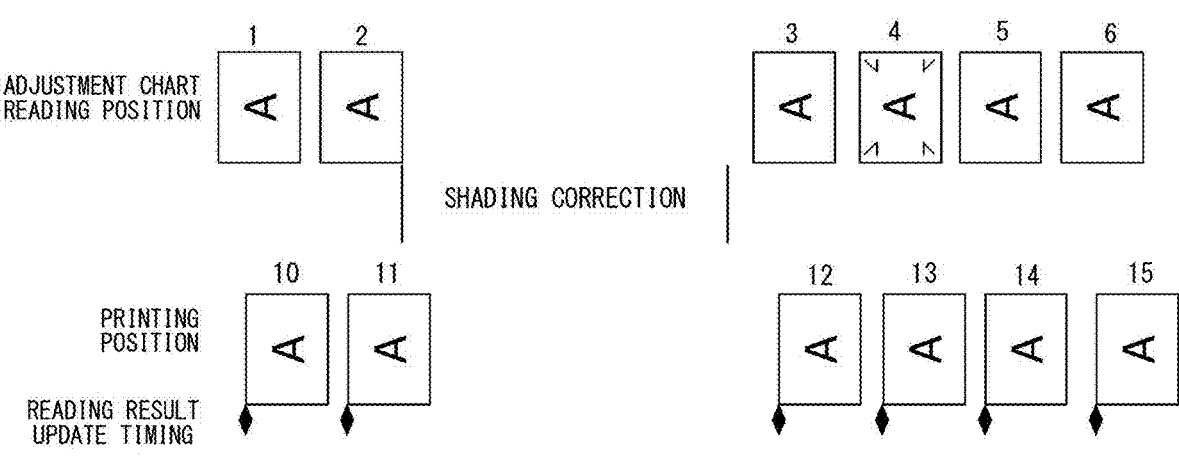
FIG. 12A and FIG. 12B are explanatory diagrams of shading correction and a read timing of an adjustment chart.

FIG. 12A and FIG. 12B are explanatory diagrams of a read timing of the adjustment chart and shading correction for each operation mode. FIG. 12A illustrates the read timing of the adjustment chart and the shading correction in the productivity priority mode. FIG. 12A illustrates a timing at which the first to the sixth sheets pass the reading position of the CIS 321, a timing at which an image is formed on the tenth to sixteenth sheets, and a timing at which the reading result of the adjustment chart is updated. FIG. 12B illustrates the shading correction at the time of the image quality priority mode and the read timing of the adjustment chart. FIG. 12B illustrates a timing at which the first to the sixth sheets pass the reading position of the CIS 321, a timing at which an image is formed on the tenth to fifteenth sheets, and a timing at which the reading result of the adjustment chart is updated.

In the case of FIG. 12A, the shading correction is started immediately after reading a rear end of the second sheet (the adjustment chart). The adjustment chart passes through the reading position of the CIS 321 and the CIS 322 in parallel with the shading correction. The CPU 222 of the printing apparatus 107 does not apply the reading result of the adjustment chart during the shading correction to adjustment for the image forming condition. Specifically, the third sheet (the adjustment chart) is a sheet which passes through the reading position during the shading correction, and the adjustment of the image forming position is not performed to the thirteenth to fifteenth sheets, which are the sheets on which the image forming is started after the rear end of the third sheet has passed the reading position. This is because the reading result stored in the memory 223 is not updated by the reading result of the third to fifth sheets (the adjustment chart).

When the reading of the sheet which is not affected by the shading correction such as the sixth sheet (the adjustment chart) is completed, the reading result of the memory 223 is updated. Therefore, the image formation positions of the sixteenth and subsequent sheets are adjusted according to the reading result.

In the case of FIG. 12B, the shading correction is started immediately after reading the rear end of the second sheet (the adjustment chart). The printing apparatus 107 does not read the adjustment chart or print the image by the print job at a timing when the shading correction is executed. Since the adjustment chart is not read during the shading correction, the reading result stored in the memory 223 is not updated. When the adjustment chart (third sheet) is read after the shading correction, the reading result stored in the memory 223 is updated. Therefore, as to the twelfth sheet, an image whose image forming position is adjusted according to the reading result of the latest adjustment chart is formed. Thus, even in a case where the timing of the shading correction and the read timing of the adjustment chart are the same, the image quality is maintained by delaying the read timing of the adjustment chart.

Figures 13, 14:
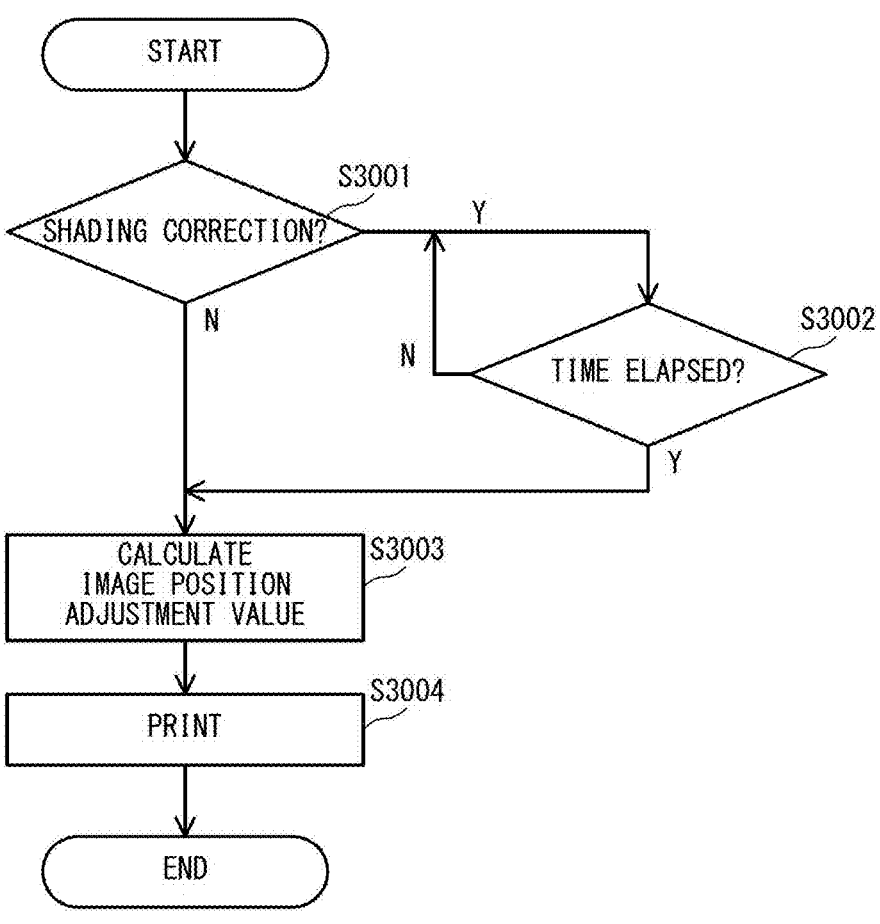
FIG. 13 is a flowchart representing a printing process in an image quality priority mode.
FIG. 14 is an explanatory diagram of a selection screen of an operation mode.

FIG. 13 is a flowchart representing the printing processing in the image quality priority mode. As described above, in the image quality priority mode, the reading of the adjustment chart and the printing of the image by the print job wait until the shading correction is completed.

The CPU 222 determines whether or not the shading correction is executed immediately before printing (Step S3001). When the shading correction is executed immediately before printing (Step S3001: Y), the CPU 222 determines whether or not the time required for the shading correction, from a timing at which the image formation on the immediately preceding sheet is completed, has elapsed (Step S3002). If the time required for the shading correction has not elapsed (Step S3002: N), the CPU 222 waits until the time required for the shading correction elapses. That is, the CPU 222 waits until the shading correction is completed.

In a case where the time required for the shading correction has been elapsed (Step S3002: Y), the CPU 222 calculates an image position adjustment value based on the reading result of the adjustment chart stored in the memory 223 (Step S3003). The reading result is a result which is read from the adjustment chart after the shading correction. When the shading correction is not executed immediately before the printing (Step S3001: N), the CPU 222 calculates the image position adjustment value based on the reading result of the adjustment chart stored in the memory 223 without waiting for the completion of the shading correction (Step S3003). The CPU 222 executes printing according to the calculated image position adjustment value (Step S3004). Thus, the printing processing at the time of the image quality priority mode is completed.

The operation mode may be switched based on, in addition to the switching based on the number of insertion interval sheets and the threshold value, the user's selection. FIG. 14 is an explanatory diagram of a selection screen of the operation mode. The CPU 222 displays such a selection screen on the display 225. The user selects the operation mode by the operation unit 224 according to the selection screen of the display 225. The operation mode can be switched according to the user's selection.

As described above, by switching between the productivity priority mode and the image quality priority mode, it is possible to suppress the decrease in productivity while maintaining the adjustment accuracy, by the reading result of the CIS 321 and the CIS 322, of the image position to be above a certain level. According to the present disclosure, the shading correction can be performed while suppressing the decrease in productivity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-098511, filed Jun. 5, 2020, which is hereby incorporated by reference herein in its entirety.

21

What is claimed is:

1. An image forming apparatus comprising:

an image forming unit configured to form an image on a sheet of a plurality of sheets based on received image data, form an adjustment image in an area of the sheet to be cut, and convey the sheet on a conveyance path;

a reading sensor configured to read the image on the sheet which passes a reading area of the conveyance path;

a reference member that is read by the reading sensor for performing a shading correction for the reading sensor;

a controller configured to:

switch operation of the image forming apparatus between a productivity priority mode and an image quality priority mode;

control a positional relationship between the reading sensor and the reference member to be a first positional relationship in a case where the reading sensor reads the image;

control the positional relationship between the reading sensor and the reference member to be a second positional relationship that is different from the first positional relationship in a case where the reading sensor reads the reference member;

control, in the productivity priority mode, in a case where an execution condition for executing reading of the reference member by the reading sensor is satisfied during a period in which both the image and the adjustment image are formed on the sheet of the plurality of sheets, the positional relationship between the reading sensor and the reference member to be the second positional relationship while continuing conveyance of the plurality of sheets including the sheet on which the image and the adjustment image have been formed to pass the reading area, wherein the reading sensor and the reference member are arranged such that the positional relationship between the reading sensor and the reference member is switched from the first positional relationship to the second positional relationship by moving either the reference member or the reading sensor while continuing conveyance of the plurality of sheets on which the image and the adjustment image have been formed along a same conveyance path in both the first positional relationship and the second positional relationship; and adjust, in the image quality priority mode, in the case where the execution condition for executing reading of the reference member by the reading sensor is satisfied during the period in which both the image and the adjustment image are formed on the sheet of the plurality of sheets, a timing for forming the adjustment image on the sheet and control the positional relationship between the reading sensor and the reference member to be the second positional relationship while continuing conveyance of the plurality of sheets to pass the reading area such that the sheet on which the image and the adjustment image have been formed passes the reading area after the shading correction has been performed.

2. The image forming apparatus according to claim 1, wherein a distance between the reading sensor and the reference member in the second positional relationship is shorter than a distance between the reading sensor and the reference member in the first positional relationship.

3. The image forming apparatus according to claim 1, wherein the reading sensor is positioned, in the first positional relationship, at a first position, and wherein the reading sensor is positioned, in the second positional relationship, at a second position closer to the reference member than in the first position.

4. The image forming apparatus according to claim 1, wherein the reference member is positioned, in the first positional relationship, at a first position, and wherein the reference member is positioned, in the second positional relationship, at a second position closer to the reading sensor than in the first position.

5. The image forming apparatus according to claim 1, wherein the shading correction is performed in a case where a condition regarding a number of sheets passing through a reading position is met.

6. The image forming apparatus according to claim 1, wherein the reading sensor includes a light source, and wherein the shading correction is performed in a case where a condition regarding a lighting time of the light source is met.

7. The image forming apparatus according to claim 1, wherein the shading correction is performed in a case where a condition regarding a temperature of the reading sensor is met.

8. The image forming apparatus according to claim 1, wherein the controller generates an image forming condition to control quality of an image to be formed by the image forming unit based on a result of the adjustment image read by the reading sensor.

9. The image forming apparatus according to claim 8, wherein the image forming condition comprises a condition to adjust a position of an image to be formed on a sheet.

10. The image forming apparatus according to claim 8, wherein the adjustment image is formed on four corners of the sheet.

11. The image forming apparatus according to claim 1, wherein color of the reference member is white.

12. The image forming apparatus according to claim 1, wherein the image forming unit is further configured to form a test image that is used to control image quality; wherein the test image is read by the reading sensor; and wherein the controller is configured to control conveyance of a sheet on which the test image has been formed so that the sheet on which the test image has been formed does not pass through the reading area at a timing when the reading sensor reads the reference member.

13. The image forming apparatus according to claim 1, wherein the image forming unit is further configured to form a test image that is used to control image quality; wherein the test image is read by the reading sensor; and wherein the controller is configured to control forming of the test image by the image forming unit so that the sheet on which the test image has been formed does not pass through the reading area at a timing when the reading sensor reads the reference member.

14. The image forming apparatus according to claim 1, wherein the reading sensor is a line sensor having a plurality of light receiving elements aligned in a direction orthogonal to a conveyance direction in which the sheet is conveyed.

15. The image forming apparatus according to claim 1, wherein the reading sensor comprises a plurality of light receiving elements in a direction orthogonal to a conveyance direction in which the sheet is conveyed, and wherein the controller is configured to:

perform reading of the reference member by moving the reading sensor in the conveyance direction so that the reading sensor and the reference member face each other; or perform reading of the reference member by moving the reference member in the conveyance direction so that the reading sensor and the reference member face each other.

16. The image forming apparatus according to claim 1, wherein the controller is configured to control, in a case where the reading of the reference member by the reading sensor is completed in the second positional relationship, the reference member to be in the first positional relationship while continuing conveyance of the plurality of sheets on which the image and the adjustment image have been formed to pass the reading area.

17. The image forming apparatus according to claim 1, wherein the adjustment image includes one of an image for detecting geometric characteristics, an image for detecting image density, or an image for detecting color misregistration.

18. The image forming apparatus according to claim 1, wherein, in a case where the image forming unit is configured to form images, based on the received image data, on both sides of the sheet, the adjustment image is also formed on both sides of the sheet.

19. The image forming apparatus according to claim 1, wherein the reading sensor is configured to not read the adjustment image during the period in which both the image and the adjustment image are formed on the plurality of sheets and the execution condition for executing reading of the reference member by the reading sensor is satisfied.

* * * * *